T. W. HINE.
STEAM ACTUATING DEVICE FOR FRICTION DRIVEN DRUMS.
APPLICATION FILED JAN. 19, 1912.
1,044,049.                            Patented Nov. 12, 1912.
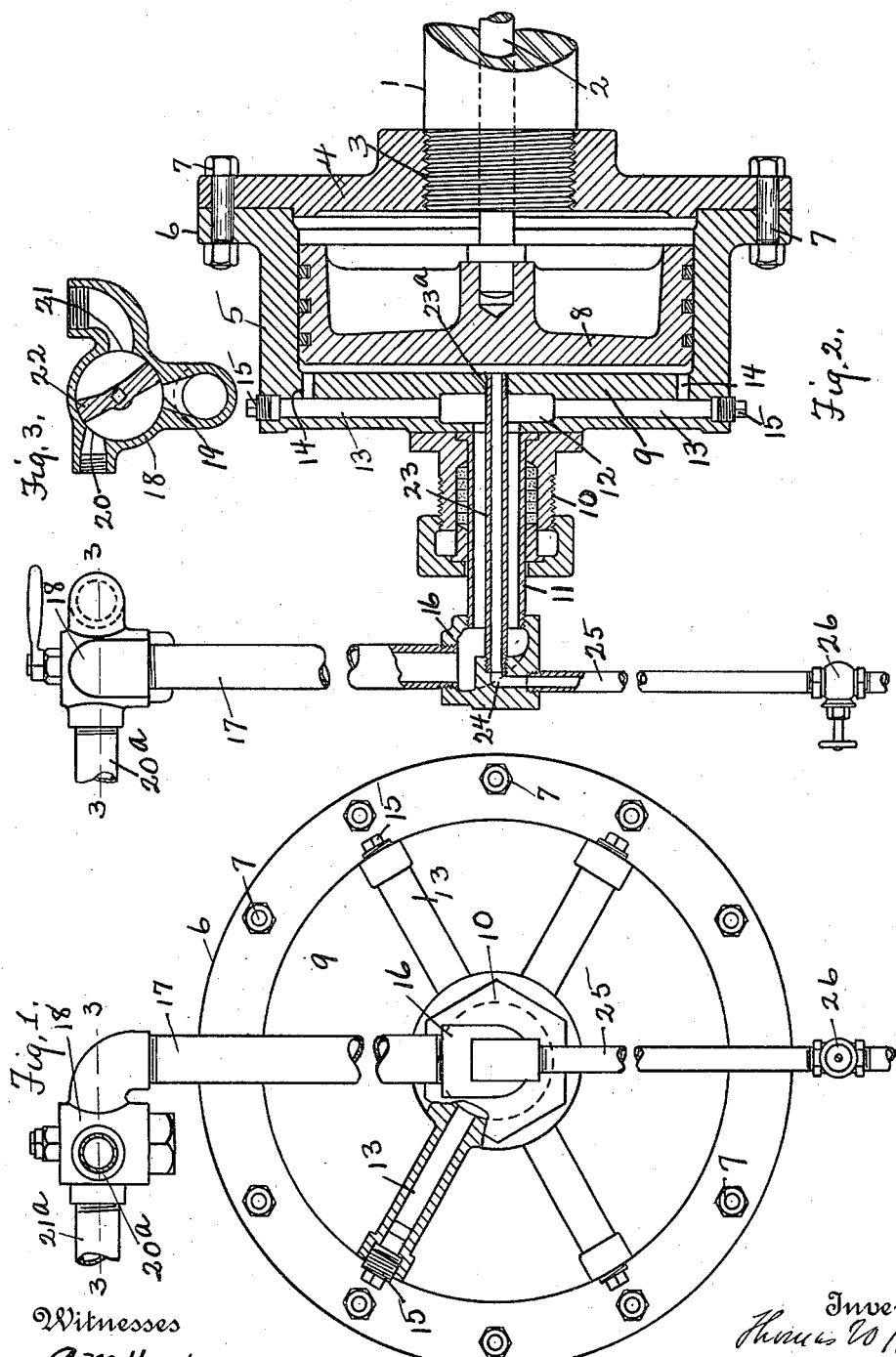

UNITED STATES PATENT OFFICE.

THOMAS W. HINE, OF EUREKA, CALIFORNIA.

STEAM-ACTUATING DEVICE FOR FRICTION-DRIVEN DRUMS.

1,044,049.     Specification of Letters Patent.     Patented Nov. 12, 1912.

Application filed January 19, 1912. Serial No. 672,176.

*To all whom it may concern:*

Be it known that I, THOMAS W. HINE, a citizen of the United States, residing at Eureka, in the county of Humboldt and State of California, have invented new and useful Improvements in Steam-Actuating Devices for Friction-Driven Drums, of which the following is a specification.

This invention relates to steam actuating devices for friction driven drums, and consists in certain improvements in the construction thereof as will be hereinafter fully described and pointed out in the claims.

The invention is particularly applicable to drums used in logging engines and under similar conditions where the mechanism is exposed.

A leading object of the invention is to provide means whereby the condensation may be blown out of the cylinders forming part of the actuating device.

Other details of the invention will appear from the specification and claims.

The invention is illustrated in the accompanying drawings as follows:—

Figure 1 is an end view of the steam actuating device. Fig. 2 a central section through the steam actuating device. Fig. 3 a section on the line 3—3 in Figs. 1 and 2.

1 marks the drum shaft, 2 the rod for actuating the clutch to lock the drum on the shaft. The drum and locking device are of ordinary construction. The drum shaft is screw threaded at 3 and the cylinder base 4 is screwed on to the shaft. The cylinder 5 has the flange 6 which is bolted to the base 4 by the bolts 7. The piston 8 operates upon the actuating rod 2. The cylinder head 9 is preferably cast integrally with the cylinder. A gland 10 is secured to the cylinder head and the steam supply pipe 11 is arranged in this gland and permits the rotation of the cylinder with the drum shaft, the gland forming the joint on the supply pipe. The supply pipe enters into a manifold cavity 12 from which the radial passages 13 extend. The radial passages are connected by the openings 14 extending through the head 9 with the interior of the cylinder, one of these passages at least being at or near the bottom of the cylinder regardless of the position of the cylinder. The radial passages 13 preferably extend entirely through the head, the ends being closed by the plugs 15. In this way ready access may be had to these passages.

The supply pipe 11 is connected with a fitting 16 and the main line 17 extends from this fitting to a valve 18. The valve 18 has three ports 19, 20 and 21. The port 19 is connected with the pipe 17. The port 20 is connected with the pipe 20ª leading to a boiler or other source of supply of steam (not shown) and the port 21 through the pipe 21ª leads to the atmosphere. The valve plug 22 as shown in Fig. 3 is arranged to connect the port 19 with the port 20. Under these conditions steam is admitted through the main line to the cylinder. The valve 22 may be thrown so as to connect the ports 19 and 21 and under these conditions the main line is connected with the atmosphere and thus exhausts from the cylinder. An auxiliary pipe 23 extends through the head 9 being journaled in the opening 23ª in the head. The pipe is screwed into the fitting 16 and connected with a passage 24 in said fitting. The passage 24 is connected with the auxiliary line pipe 25 which is controlled by the valve 26. In the use of these drums especially in logging operations some difficulty is encountered with the condensation in the cylinder and in keeping the lines hot. With this device this difficulty is entirely obviated. Before throwing in the friction, the engineer throws the valve 22 so as to connect the main pipe 17 with the atmosphere, at the same time opening the valve 26 and allowing the inflow of steam through the auxiliary pipe 23. The steam entering by this pipe draws any condensation there may be in the cylinder through the openings 14 out through the main pipe to the atmosphere. At the same time this initial flow of steam warms up the main pipe any condensations there may be in this process being carried out with the steam through the exhaust. The result is that when the main line is turned in the live steam is turned into the warm pipe and cylinder so that the condensation is very much reduced and the efficiency of the apparatus very materially increased. The valves 18 and 26 are ordinarily arranged in proximity so as to be readily actuated from the position used in connection with the other controlling devices of the engine (not shown).

What I claim as new is:—

1. In a steam actuating device for friction driven drums, the combination of a drum shaft; a cylinder on the shaft; a piston in the cylinder; a steam line leading to the cylinder; a second line leading from the cylinder; and valves controlling said lines to permit the turning of live steam through one line and exhausting through the other.

2. In a steam actuating device for friction driven drums, the combination of a drum shaft; a cylinder on the shaft; a piston in the cylinder; a main steam line leading to the cylinder; a valve mechanism for connecting the main line with the steam supply and with an exhaust; an auxiliary line leading to the cylinder; and a valve for controlling the auxiliary line.

3. In a steam actuating device for friction driven drums, the combination of a drum shaft; a cylinder on the shaft; a piston in the cylinder; a main steam line leading to the cylinder; a three way valve on the main line adapted to connect the main line with the supply or an exhaust; an auxiliary line leading to the cylinder; and a valve controlling the auxiliary line.

4. In a steam actuating device for friction driven drums, the combination of a drum shaft; a cylinder on the shaft; a piston in the cylinder; a main steam line leading to the cylinder; a joint between the cylinder and the main line; an auxiliary line extending into the main line and to the cylinder; a valve mechanism for connecting the main line with the steam supply and with an exhaust; and a valve controlling the auxiliary line.

5. In a steam actuating device for friction driven drums, the combination of a drum shaft; a cylinder on the shaft, said cylinder having radial passages extending to a central manifold, the ends of said radial passages terminating in the cylinder near its circumferential walls; a piston in the cylinder; a main line leading to said radial passages; an auxiliary line leading through the main line to the central part of the cylinder; a valve mechanism for connecting the main line with the supply or the exhaust; and a valve controlling the auxiliary line.

6. In a steam actuating device for friction driven drums, the combination of a cylinder; a piston in the cylinder; a steam line leading to the cylinder; a second line leading from the cylinder; and valves controlling said lines to permit the turning of live steam through one line and exhausting the same by way of the cylinder through the other.

7. In a steam actuating device for friction driven drums, the combination of a cylinder rotatively mounted and having radial passages terminating within the cylinder near the circumferential walls thereof; a central manifold from which said radial passages lead; a main line leading to said central manifold; and means controlling said line.

In testimony whereof I have hereunto set my hand in the presence of two subscribing witnesses.

THOMAS W. HINE.

Witnesses:
WALTER H. DALTON,
ALMA EMIGHOLZ.

Copies of this patent may be obtained for five cents each, by addressing the "Commissioner of Patents, Washington, D. C."